United States Patent [19]

Becht et al.

[11] 4,232,760
[45] Nov. 11, 1980

[54] LADDER ASSEMBLY AND METHOD OF MAKING SAME

[75] Inventors: George L. Becht, Orchard Park; Jerome A. Melachowski, Williamsville; Richard J. Wolicki, Buffalo, all of N.Y.

[73] Assignee: Buffalo Brake Beam Company, Lackawanna, N.Y.

[21] Appl. No.: 896,791

[22] Filed: Apr. 17, 1978

Related U.S. Application Data

[63] Continuation-in-part of Ser. No. 774,586, Mar. 7, 1977, abandoned.

[51] Int. Cl.² .......................... E06C 5/24; E06C 7/08; E06C 7/50
[52] U.S. Cl. ...................................... 182/194; 182/93; 182/228
[58] Field of Search .................. 182/228, 194, 93, 99, 182/90; 113/116 HA

[56] References Cited

U.S. PATENT DOCUMENTS

| 1,424,115 | 7/1922 | Nileon | 182/198 |
|---|---|---|---|
| 1,584,119 | 5/1926 | Moecker | 113/116 HA |
| 2,776,793 | 1/1957 | Nystrom | 182/93 |
| 3,031,029 | 4/1962 | Davis | 182/198 |

FOREIGN PATENT DOCUMENTS 170487 7/1916 Canada ........................ 182/93

*Primary Examiner*—Reinaldo P. Machado
*Attorney, Agent, or Firm*—Christel, Bean & Linihan

[57] ABSTRACT

A fabricated steel ladder is provided particularly adapted for use on the sides of railroad cars and the like wherein the ladder rungs are formed with ends turned in 90 degrees in a manner so that cracks are avoided in the steel grains adjacent the inner radius of each turned end. A special indentation is formed on the inside surface of the turned end adjacent to the point of bending—the indentation causing a desired material flow so as to avoid cracking while increasing the material strength. The rung ends are cold headed during assembly with the other components of the ladder structure which avoids the necessity of separate fasteners used in prior art designs, and insures that substantially no radial clearance will be left between the rung ends and the apertures in which they are mounted and furthermore insures that the rung will be firmly affixed to the ladder stiles in an axial sense so as to eliminate looseness and rattle in the resulting structure.

2 Claims, 5 Drawing Figures

LADDER ASSEMBLY AND METHOD OF MAKING SAME

CROSS REFERENCE TO A RELATED APPLICATION

This application is a continuation-in-part of our pending application Ser. No. 774,586, entitled "Ladder Assembly & Method of Making the Same," filed Mar. 7, 1977 and now abandoned.

BACKGROUND OF THE INVENTION

This invention relates generally to metal ladders which are permanently attached to structural bodies, and more particularly to an improved railroad car ladder and method for making the same whereby a rigid assembly is provided, free of rattle and looseness.

A number of problems exist in regard to prior art railroad car ladders and in particular with respect to the method of making or manufacturing such prior art ladders. It has been common practice to utilize a pair of parallel side rails, or stiles as they are known in the trade, having correspondingly aligned coplanar apertures into which the ends of ladder rungs which have been turned 90° are fastened, as for example by means of a threaded nut connection. Necessarily, it is very time consuming to install such a plurality of individual fasteners. In addition, it is known to place the ends of such ladders rungs through apertures in the stiles and to then "peen over" or flatten out to some degree the extreme ends of the rung in a somewhat rivetinglike manner so that the rungs may not be withdrawn from either stile.

However, in utilizing separate fasteners or in "peening over" the ends of the rungs to prevent withdrawal thereof from the stiles, both procedures suffer from the same deficiencies. One deficiency resides in the fact that a clearance must be provided between the outer surface of the rung ends and the inner surface of the stile apertures so that the rung ends may be inserted therethrough. Accordingly, the rung is subject to a loose fit in a radial sense, with respect to the aperture, and may further be subject to limited travel in an axial sense, with respect to the aperture, since the above assembly procedures only restrain the rung from withdrawal out of the stile aperture but not further insertion into or through the aperture, even though such axial movement may in fact be limited due to the connection at the opposite end of the rung. Another deficiency resides in the fact that the formation of traditional right angle bends in a metal bar (rung) causes a severe compression at the inside radius when the bend has a relatively small inside radius. The compression causes the metal grains to flatten which tends to create parting planes (cracks) between the flattened grains.

SUMMARY OF THE INVENTION

Accordingly, one object of the present invention is to provide a new and improved ladder for railroad cars, and other similar types of uses, which is rigid in construction and free of rattle and looseness.

Another object of the present invention is to provide an improved ladder construction which avoids the need for fasteners to assemble rungs to the ladder stiles.

A further object of the present invention is to provide the aforesaid ladder construction with metal rungs which are turned in 90 degrees at their ends and which resist cracking at the point of turning (bending).

Still another object of the present invention is to provide the aforesaid ladder construction by a manufacturing procedure which utilizes a simplified rung and stile arrangement.

Yet still another object of the present invention is to manufacture the above ladder constructions on an assembly line basis instead of on an individual basis during installation thereof.

In summary, the present invention provides a fabricated steel ladder for railroad vehicles and other similar types of applications wherein the ladder rungs are cold formed during assembly so as to eliminate the need for separate fasteners to attach the rung ends to the ladder stiles. The ladder rungs are formed of a special quality steel having specified cold forming qualities while the remaining ladder components such as the stiles and brackets may be formed of relatively standard, low carbon hot rolled steel. Specifically, the present invention is directed to the formation of 90 degree turns on the ends of the rungs in such a manner that cracking of the metal grains adjacent the point of bending or turning may be avoided. In forming the 90° bends, an indentation is imparted to the inside surface of the rung adjacent to the point of bending. The indentation allows the main body portion of the rung to be mounted against a stile in a flush manner and further causes a desired material flow such that the rung material assumes a much higher strength and toughness. In particular, the metal grains adjacent the point of bending encounter inward radial compression from the indentation as well as longitudinal compression due to the bending whereby the resultant compression on such metal grains becomes balanced which in turn avoids the development of cracks in the material.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF THE INVENTION

Figure 1:
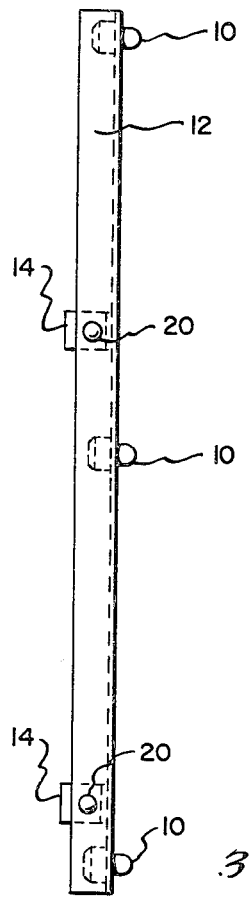
FIG. 1 is a lefthand end elevational view of a railroad car ladder incorporating mounting bracket clips in conjunction with a pair of stiles and attached rungs.
Figure 2:
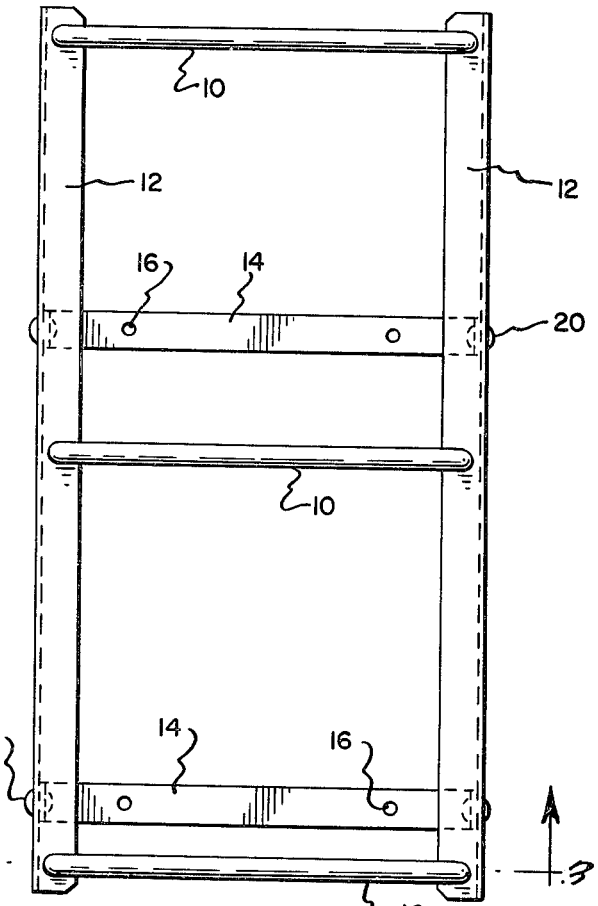
FIG. 2 is a front elevational view of FIG. 1.

Referring now in detail to the illustrative embodiments depicted in the accompanying drawings, there is shown in FIG. 2 a ladder assembly having a plurality of rungs 10 and associated side rails or stiles 12. In addition to the joining of the stiles one to the other as afforded by the rungs 10, the stiles are rigidly affixed to one another by the cross brackets 14 which each include mounting apertures 16 for purposes of mounting a sub-assembled ladder structure in place, such as on the side of a railroad car, as generally contemplated within the scope of the present invention. However, it is readily apparent that such a ladder construction could be employed in a variety of ways other than on railroad vehicles specifically.

Figure 3:
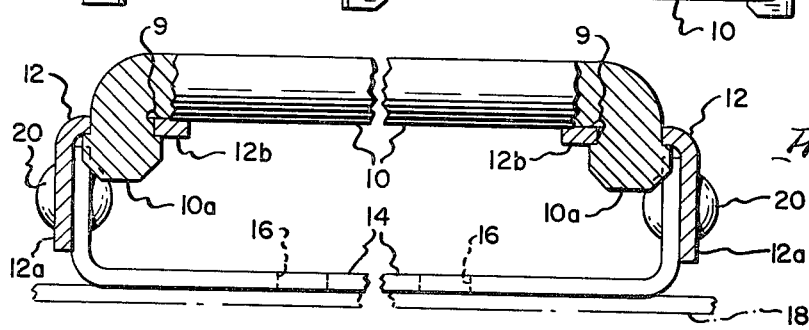
FIG. 3 is an enlarged bottom view with portions broken away and partle in section of the aforesaid ladder as taken about on line 3—3 of FIG. 2.

Turning to FIG. 3, the stiles 12 are shown to include a pair of divergent flanges 12a and 12b while the cross bracket clip 14 is shown to be of U-shaped configuration having a base portion and a pair of upstanding leg portions. The base portion of the cross bracket clip is shown as mounted in a flush manner against the surface 18 which is shown in broken line form, and, as indicated above, could represent a variety of structural surfaces, one being the vertical sidewall of a railroad car. Although not shown, fastening means would be engaged through apertures 16 in the base portion of the cross bracket clip 14 for purposes of securing the cross bracket clip and the attached ladder structure to surface 18.

The flanges 12a on the stiles are disposed adjacent to the outboard sides of the cross bracket legs in a substantially parallel manner with respect thereto. The flanges 12a are fixed to the cross bracket legs by use of a rivet-like connector 20 which is disposed through aligned apertures in the flanges 12a and respectively associated bracket legs. The connector 20 is cold formed in place in a manner similar to the installation of the rung ends to the stile flanges 12b as to be more fully described hereinbelow.

In a railroad car structure, it is desirable and in fact required that the ladder structure project laterally outward from wall surface 18 only to a limited degree. Generally such requirements relate to the fact that the greatest transverse dimensional projection of the car must be within a limited specification so as to insure proper lateral clearance of the car during use. Accordingly, it is important to maintain rung 10 within a certain proximity to the mounting surface 18 so that the transverse width of the railroad car may be maximized. For these reasons, it becomes desirable to assemble the main body of the rung as closely to the flanges 12b as possible.

Figure 4:
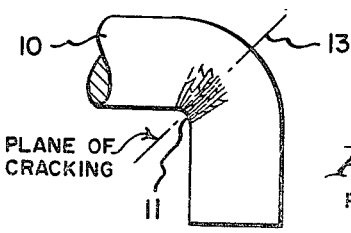
FIG. 4 is an isolated view of a 90 degree turn in a prior art metal bar illustrating the relative flattening of the metal grains adjacent the inside radius of the turn and the orientation of a plane of cracking which tends to develop.
Figure 5:
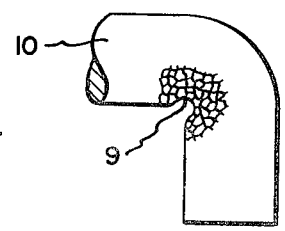
FIG. 5 is an isolated view similar to FIG. 4 illustrating the absence of any cracking in the metal grain structure due to the equalized compression experienced by the metal grains.

The ends of the rungs 10 are turned in substantially 90 degrees with respect to the longitudinl axis thereof. In forming the 90 degree bends on the rung ends, the transverse cross section thereof adjacent to the point of bending would normally assume an oblong configuration. Turning to FIGS. 4 and 5, the distinction between the prior art (FIG. 4) and the presently disclosed method for providing the turned in ends on rungs 10 can be understood. In FIG. 4, a traditional or prior art right angle bend in a metal bar causes severe comspression at the inside radius 11 when the bend has a relatively small inside radius. Such compression causes the metal grains to flatten as illustrated in FIG. 4 which tends to result in parting or cracking of the metal material in the long direction of the grains. Line 13 indicates the orientation of a potential plane of cracking. FIG. 5 represents a right angle bend formed by the method of the present invention. In forming the bend in FIG. 5, pressure is directed radially inwardly against the bar at the point of bending which tends to compress the metal grains in a direction transverse to the direction of compression illustrated in FIG. 4. Specifically, in providing the FIG. 5 bend, an indentation 9 is created which affirmatively creates the desired grain orientation. In FIG. 5, the metal grains adjacent to indentation 9, therefore experience compression in a longitudinal sense as considered in FIG. 4 and in a direction transverse thereto as resulting from the formation of indentation 9. Accordingly, the strength of the end of the rung is increased due to such cold working of the material. Furthermore, the method described with respect to forming the 90° bend in FIG. 5 would be applicable to bends other than 90°.

The rungs 10 may be fabricated, for example, from special quality steel having specified cold forming characteristics. Such special quality steel may be of a hot rolled carbon variety, as for example set forth in specification ASTM A-576 grade C-1015 outlined in the AAR Manual of Standards and Recommended Practices. The ladder stiles and cross brackets, not being subject in general to the cold forming procedure, as described herein, do not have to have any unusual structural requirements and therefore, as in prior art ladders, may be formed of low carbon hot rolled steel.

With respect to FIG. 3, specialized cold forming equipment is employed to cold head the rung ends 10a into and about the apertures provided in flanges 12b. Necessarily, this can be performed on an assembly line basis instead of individual assembly of the rungs during installation of the ladder assembly as practiced in the prior art. A feature of the present invention is the fact that the ends of the rungs are deformed to substantially eliminate any clearance between the outer surface of the rung ends and the apertures in flanges 12b so as to create a press fit. The rung ends are also press fitted into place in an axial sense with respect to the apertures in flange 12b since the indentations 9 allow the main body portions of the rungs to be mounted against the stile flanges 12b. In regard to the FIG. 3 structure, the formed head portion 10a on the rung most effectively restrains the rung against withdrawal from flange 12b while the abutment of the main body portion of the rung against the flange 12b resists further movement into the rung receiving apertures provided in flanges 12b. Accordingly, in cold forming or cold heading the ends of the rung, a highly effective joining of the rung to the stiles is provided.

Although the ladder rung material may be relatively more expensive than the steel from which the stiles and cross brackets are formed, such higher cost is more than offset by the relatively greater cost of energy which would be required to heat the rung ends for hot forming or the labor costs which would be necessitated to individually install fasteners on the rung ends.

From the foregoing, it is apparent that the objects of the present invention have been fully accomplished. As a result of this invention, an improved fabricated metal ladder is provided for use in railroad car applications. The controlled bending for forming the turned in rung end portions results in a metal grain structure adjacent the point of bending free of cracks since those grains are generally under balanced compression. The cold heading of the rung ends as described hereinabove is most effective in eliminating loose connections between the rungs and the stile members to which they are affixed or connected. It should be readily apparent to those skilled in the art that various aperture configurations could be provided in the stiles for receiving the rung ends and that various types of cold headed configurations could be provided on the ends of the rungs so as to insure a positive joining of the rungs to the stiles, thereby eliminating relative movement therebetween.

Having thus described and illustrated a preferred embodiment of our invention, it will be understood that such description and illustration is by way of example only and that such modifications and changes as may suggest themselves to those skilled in the art are intended to fall within the scope of the present invention as limited only by the appended claims.

We claim:

1. A ladder having a plurality of rungs comprising:

a pair of metal styles, each style having a front planar face and a rear planar face disposed parallel to the rungs and having a plurality of rung receiving apertures so disposed that corresponding rung receiving apertures on each style are vertically aligned, and a plurality of rungs disposed between said styles, each of said rungs consisting of a rod of cold working steel, the ends of said rods bent at substantially a 90° angle about an axis defined by a generally arcuate indentation forming the inside radius of said angle, the main body portion of said rods abutting the front planar face of said styles, the ends of said rods extending through the apertures of said styles and secured therein by a cold formed head of greater dimension than said aperture, said head abutting the rear planar face of said styles.

2. The ladder of claim 1 wherein the rods forming said rungs are further characterized in that the metal grains adjacent the inside radius of the rod bends are in substantially balanced compression and free of planar cracks.

* * * * *

UNITED STATES PATENT AND TRADEMARK OFFICE
CERTIFICATE OF CORRECTION

PATENT NO. : 4,232,760
DATED : November 11, 1980
INVENTOR(S) : George L. Becht, Jerome A. Malachowski, Richard J. Wolicki It is certified that error appears in the above-identified patent and that said Letters Patent are hereby corrected as shown below:

Change inventor's name from "Melachowski" to --Malachowski--.

Signed and Sealed this

First Day of September 1981

[SEAL]

Attest:

GERALD J. MOSSINGHOFF

Attesting Officer

Commissioner of Patents and Trademarks